United States Patent [19]

Shah

[11] Patent Number: 4,978,896
[45] Date of Patent: Dec. 18, 1990

[54] METHOD AND APPARATUS FOR CONTROLLING A BLOWER MOTOR IN AN AIR HANDLING SYSTEM

[75] Inventor: Rajendra K. Shah, Fort Wayne, Ind.

[73] Assignee: General Electric Company, Fort Wayne, Ind.

[21] Appl. No.: 385,664

[22] Filed: Jul. 26, 1989

[51] Int. Cl.⁵ .............................................. G05D 29/00
[52] U.S. Cl. ..................................... 318/254; 318/432; 318/481; 236/DIG. 9
[58] Field of Search ............... 318/138, 254, 439, 434, 318/432, 433, 481; 307/118; 236/1 B, 1 C, 1 G, 34, 35, 35.3, DIG. 9

[56] References Cited

U.S. PATENT DOCUMENTS

| | | | |
|---|---|---|---|
| 4,504,881 | 3/1985 | Wada et al. | 318/434 X |
| 4,648,551 | 3/1987 | Thompson et al. | 165/40 X |
| 4,806,833 | 2/1989 | Young | 318/481 X |
| 4,818,924 | 4/1989 | Burney | 318/561 |
| 4,858,676 | 8/1989 | Bolfik et al. | 165/42 X |
| 4,860,231 | 8/1989 | Ballard et al. | 318/802 X |

Primary Examiner—Bentsu Ro
Attorney, Agent, or Firm—Ralph E. Krisher, Jr.

[57] ABSTRACT

Apparatus and method for controlling a motor having a stationary assembly with a plurality of winding stages for carrying motor current and further having a rotatable assembly in driving relation with a blower in an air handling system. The apparatus provides control of the blower speed over a range of static pressure variations to maintain relatively constant preselected rate of air flow in the system. The apparatus receives a preselected flow rate signal representing the preselected air flow rate. A microprocessor, responsive to both the preselected flow rate signal and a speed signal, generates a desired torque signal which is a function of both the preselected flow rate signal and the speed signal. The desired torque signal is compared to a signal representing motor torque and a comparison signal representing the comparison is generated. An IC control applies a motor voltage to one or more of the winding stages at a time in accordance with the comparison signal and commutates the winding stages in a preselected sequence to rotate the rotatable assembly. As a result, the blower is driven by varying the motor torque according to motor speed to maintain substantially constant air flow in the system at the preselected rate substantially independent of variations in the static pressure.

28 Claims, 3 Drawing Sheets

METHOD AND APPARATUS FOR CONTROLLING A BLOWER MOTOR IN AN AIR HANDLING SYSTEM

FIELD OF THE INVENTION

This invention relates in general to systems for conditioning the temperature of a space and, in particular, to a system for conditioning air and for maintaining a preselected flow rate of the conditioned air through at least a part of the system regardless of the static pressure therein, a method of operating a system for conditioning air, and a circuit.

BACKGROUND OF THE INVENTION

In the past, various different techniques are believed to have been utilized in an attempt to flow air through a contained space of a system including an apparatus for conditioning the temperature of the air with the rate of such air flow being related to the static pressure associated with such system. Both the speed and torque of an electric motor driving a fan or blower to effect air flow through the system are affected by the static pressure in the system. The rate of air flow (CFM—cubic feet per minute) through the apparatus also affects the motor speed and torque.

One approach of the past involved the rather laborious and time consuming matching of motor speed and torque with the proper fan to approximate the desired air flow rate for the particular contained space and static pressure of the particular apparatus or system in which such apparatus was employed However, this did not accommodate variations in the static pressure in the system caused by alterations in the system such as opening, closing or adjusting of a vent or the like connecting a conditioned space in air flow relation with the system.

If the fan or blower utilized in the past was of the fan or blade type, a decrease in the static pressure acting on such fan resulted in an increase in the speed of the fan and the electric motor driving it. Conversely, if the static pressure acting on the fan was increased, the speed of the fan and electric motor decreased. Thus, the speed of the fans and electric motors utilized in the past varied inverselY with a variation of the static pressure in the system.

As recognized in coassigned U.S. Pat. No. 4,806,833, incorporated herein by reference in its entirety, a decrease in the static pressure acting on a squirrel cage blower results in a decrease in the speed of the squirrel cage blower and the electric motor driving it. Conversely, if the static pressure acting on the squirrel cage blower is increased, the speed of the squirrel cage blower and its driving electric motor is increased. Thus, it was found that the speed of the squirrel cage blower and its driving electric motor varies directly with a variation in the static pressure. Accordingly, U.S. patent No. 4,806,833 discloses a method of operating a system for conditioning air including a variable speed blower for flowing the conditioned air through a contained space having a static pressure therein. In this system, the speed of the blower is set to affect a preselected flow rate at an existing static Pressure in the contained space and the speed of the blower is altered only in response to a variation in the static pressure and only in following relation with the static pressure variation. The speed alteration of the blower is sensed, and the speed of the blower is altered in following relation with the sensed speed alteration to establish the preselected flow rate through the contained space at the varied static pressure acting on the blower.

Although this approach is an improvement over the prior art, it is only a rough approximation of the characteristics needed to achieve constant air flow with respect to changes in static pressure. In general, the systems of the prior art worked reasonably well over a limited range of air flows and static pressures by employing a single slope speed compensation technique. It has now been recognized that a much more accurate approach to providing speed compensated torque which can be implemented in an air handling system is required. Such speed compensated torque would then allow the blower motor to maintain air flow in the system independent of variations in the static pressure in the duct work.

SUMMARY OF THE INVENTION

Among the several objects of the present invention may be noted the provision of an improved system for conditioning air and for maintaining a preselected air flow rate of the conditioned air through at least a part of the system regardless of the static pressure therein, an improved method of operating the system, and an improved circuit which will overcome the above-discussed disadvantages or undesirable features as well as others, of the prior art; the provision of such improved system and method in which the preselected flow rate is accurately controlled; the provision of such improved system and method in which wide variations in the static pressure are readily accommodated; the provision of such improved system and method in which the torque of a a dynamoelectric machine driving blower means is altered with variations in the speed of the motor to maintain constant air flow rate independent of static pressure on the blower means; the provision of such improved system and method in which the energization of a dynamoelectric machine is adjustably regulated in order to maintain the preselected flow rate at static pressure variations acting on the blower means; and the provision of such improved system, method and circuit utilizing a microprocessor and other component parts which are simple in design, easily assembled and economically manufactured. These as well as other objects and advantageous features of the present invention will be in part apparent and in part pointed out hereinafter.

In general, an apparatus is provided in one form of the invention for controlling a fluid handling system including a motor having a stationary assembly with a plurality of winding stages for carrying motor current and further having a rotatable assembly in driving relation with a fluid pump in the fluid handling system, such as blower in an air handling system. The system further includes means for generating a desired system parameter signal which varies as a function of a desired value for the parameter. The apparatus provides control of the fluid pump over various operating conditions of the fluid handling system, such as over a range of static pressure variations to the system. maintain the parameter of the system, such as rate of air flow in at substantially the desired value. Means provides a motor torque signal representative of the motor torque. Means provides a speed signal representative of the speed of the motor. A microprocessor which is responsive to both the desired parameter signal and the speed signal generates a desired torque signal which is a function of both the desired parameter signal and the speed signal. Means compares the desired torque signal to the motor torque signal thereby to supply a comparison signal. Means applies a motor voltage to one or more of the winding stages at a time in accordance with the comparison signal and commutates the winding stages in a preselected sequence to rotate the rotatable assembly whereby the fluid pump is driven the value of the parameter substantially at air flow in the system the desired value substantially independent of variations in the operating conditions of the fluid handling system.

BRIEF DESCRIPTION OF THE DRAWINGS

Corresponding reference characters indicate corresponding parts throughout the several view of the drawings.

DETAILED DESCRIPTION OF THE PREFERRED EMBODIMENT

Figure 1:
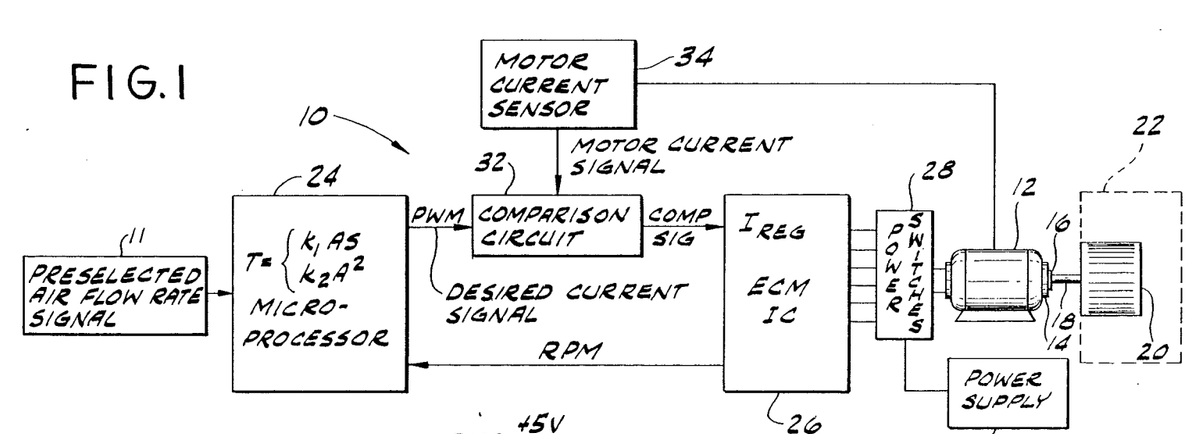
FIG. 1 is a block diagram of a preferred embodiment of an air system including the apparatus of the present invention.

Referring to the drawings and particularly to FIG. 1, reference character 10 generally refers to an apparatus according to the invention for controlling a dynamoelectric machine such as motor 12 by varying the motor torque according to motor speed (i.e., speed compensated torque). Motor 12 includes a stationary assembly 14 with a plura of winding stages for carrying motor current and further includes a rotatable assembly 16 in driving relation with a blower in an air handling system. As illustrated, rotatable assembly 16 is connected by drive shaft 18 to a squirrel cage blower 20 which is within a contained space such as an air handling system 22. The apparatus 10 provides control of the speed of blower 20 over a range of static pressure variations within the air handling system to a maintain relatively constant preselected rate of air flow in system 22. Although blower 20 is illustrated as a squirrel cage blower, it is contemplated that rotatable assembly 16 may be in driving relation with any type of blade, fan, blower or other device for moving air in air handling system 22.

In general, apparatus 10 is associated with a device or system 11 for providing a preselected flow rate signal representing the preselected air flow rate. For example, apparatus 10 may be associated with a thermostat or microprocessor which is controlling operation of the air handling system in response to sensors and operator input. In any case, apparatus 10 is adapted to receive a preselected air flow signal representing the preselected air flow rate. Preferably, this signal has a dc voltage which is directly proportional to the preselected air flow rate. In general, the signal may be variable or it may have one of several preset levels. For example, in more sophisticated air handling systems which are controlled by microprocessors, the preselected air flow signal may vary over a range of, say, zero to five volts to represent a preselected air flow rate from 400 to 1300 CFM. Alternatively, many air handling systems have two or three levels of operation corresponding to a low speed, a high speed and an override heating speed. The low speed may correspond to 400 CFM, the high speed to 800 CFM and the override heating speed to 1300 CFM. The preselected air flow signal would then take the form of one of three voltage levels corresponding to these three different preselected levels of air flow rates.

The preselected air flow signal is provided to microprocessor 10 along with a speed or rpm signal representative of the speed of motor 12. In general, apparatus 10 includes means for providing a speed signal representative of the speed of the motor such as integrated circuit 26. Reference character 26 refers to an integrated circuit (IC) which is generally a universal IC for use as a commutating circuit in combination with an electronically commutated motor. Such an IC is described in coassigned U.S. Pat. No. 4,500,821 to Bitting et al., incorporated herein by reference. IC 26 constitutes means for applying a motor voltage to one or more of the winding stages and for commutating the winding stages in a preselected sequence to rotate the rotatable assembly. In general, IC 26 has an input $I_{reg}$ which receives a signal indicative of the desired torque or air flow rate and defining the periods during which the motor voltage should be apPlied to the winding stages. IC 26 generally controls a plurality of power switching devices 28 which apply a voltage supplied by power supply 30 to the winding stages. IC 26 controls power switches 28 to commutate the winding stages of motor 12 in a preselected sequence to rotate the rotatable assembly of the motor 12.

In one preferred embodiment, IC 26 controls power switches 28 in accordance with the sensed back emf of the winding stages. By sensing the back emf, IC 26 generates a tachometer signal or rpm signal which is representative of the motor speed. This signal is provided to microprocessor 10. Microprocessor 10 is responsive to both the rpm signal provided by IC 26 and the preselected air flow signal provided by the air handling system control. In response to these signals, microprocessor 24 generates a desired current signal which is a function of both the preselected flow rate signal and the rpm signal. In effect, the desired current signal corresponds to a desired torque signal because the torque of the motor is directly proportional to the motor current. In one preferred embodiment, the desired current signal takes the form of a pulse width modulated (PWM) series of pulses having a duty cycle which is a function of both the preselected flow rate signal and the speed signal.

The desired current (torque) signal is compared by comparison circuit 32 to a motor current (torque) signal which represents the sensed motor current (torque). The motor current signal is generated by a motor current sensor 34 well known to one skilled in the art. For example, motor current sensor 34 may be a shunt resistor connected to the primary power supply line of the voltage applied to the motor windings. Alternatively, the motor current sensor may be a sensor such as disclosed in copending and coassigned U.S. Pat. application Ser. No. 235,995 filed Aug. 24, 1988, invented by William Archer entitled Method and Apparatus for Sensing Direct Current of One Polarity in a Conductor and Electronically Commutated Motor Control Responsive to Sense Motor Current. Alternatively, the motor current sensor may sense any parameter of the motor which is directly proportional to motor torque.

In the event that the motor current signal represents a motor current which is less than the desired current signal, comparison circuit 32 provides a comparison signal to the $I_{reg}$ input of IC 26 which indicates that the motor voltage should be continued to be applied to the motor windings. When the motor current signal indicates that the motor current is equal to the desired current signal or whenever the motor current signal indicates that the motor current is equal to or greater than the desired current signal, comparison circuit 32 generates a comparison signal provided to the $I_{reg}$ input of IC 26 which indicates that the motor voltage should not be applied any longer to the winding stages. In one preferred embodiment, if the comparison signal is high, IC 26 applies the motor voltage to the winding stages and if the comparison signal is low, IC 26 does not apply the motor voltage to the winding stages.

Figure 2:
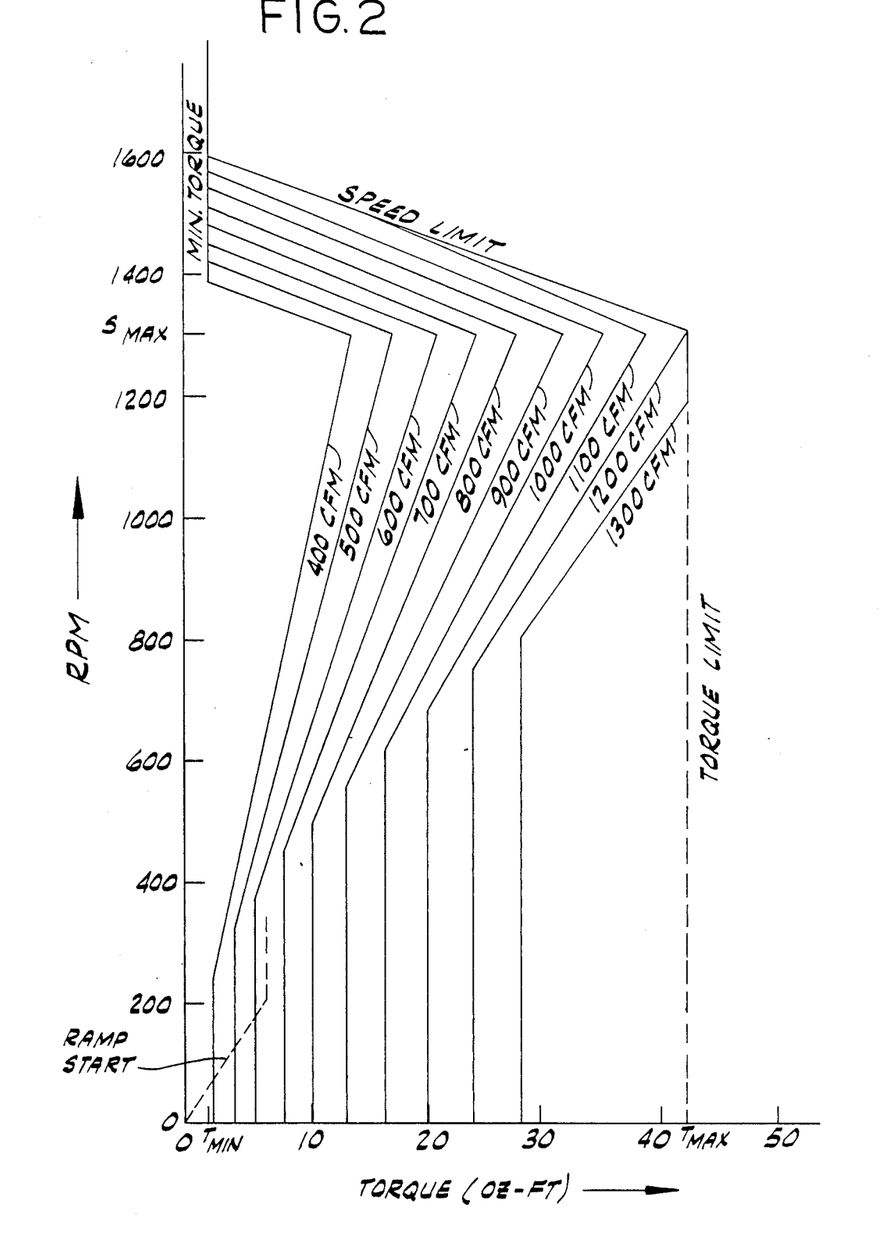
FIG. 2 of speed along the ordinate versus torque along the abscissa of a motor operating at various air flow rate demand levels under the control of apparatus of this invention.

In one preferred embodiment according to the invention, microprocessor 24 implements a constant air flow algorithm to control the motor 12 according to the principle of speed compensated torque. This type of control significantly enhances the independence of the air flow rate of the motor to static pressure within air handling system 22. As indicated above, depending on the type of blower 20, changes in the static pressure within the air handling system 22 will result in changes in the speed of blower 20. The principle of speed compensated torque allows the motor to rotate the blower to maintain air flow in the system 22 independent of variations in static pressure. In the past, the speed versus torque characteristics, such as suggested by Young in U.S. Pat. No. 4,806,833, were all straight lines parallel to each other. The slope of these parallel lines was the same for all air flow levels such as illustrated in FIG. 4 of the Young patent. In contrast, microprocessor 24 implements an algorithm so that the speed versus torque characteristics for every air flow level have a different slope. This aspect of the invention is illustrated in FIG. 2. Except at low speeds which will be explained below, the speed torque characteristic for any given air flow rate is a straight line passing through the origin with a slope (torque/speed) that is directly proportional to the level of air flow rate that is to be maintained. The proportionality constant depends on the size of the blower wheel and the number of blades. In the curves illustrated FIG. 2, it has been assumed that the blower 20 is a squirrel cage. As noted above, the speed torque characteristics may change depending on the type of blower being used and the type of system within which the blower is located.

In general, the desired current signal provided by microprocessor 24 comprises a pulse width modulated series of pulses having a duty cycle which is defined by an algorithm in which the duty cycle is a function of the rpm signal and the preselected air flow signal. In particular, microprocessor 24 operates in accordance with the following algorithm: $T=k_1AS$, wherein T equals the duty cycle of the series of pulses and is directly proportional to the desired torque (current) needed to maintain the preselected air flow rate, A equals the preselected rate of air flow, S equals the motor speed and $k_1$ equals the proportionality constant representing the characteristics of the blower 20 in the air handling system 22.

At low speeds, to continue to maintain air flow, it has been found that the characteristic should preferably become constant torque in nature. At low speeds, the torque is directly proportional to the square of the desired air flow level. At speeds above the maximum operating speed at maximum torque, the torque is rapidly reduced. In this case, the algorithm takes the following form:

$T=T_{min}$ for $S \geq S_{lim}$, $T=-k_3AS+C$ for $S_{lim} \geq S \geq S_{max}$, $T=k_1AS$ for $S_{max} \geq S \geq (k_2/k_1)A$, and
$T=k_2A^2$ for $S \leq (k_2/k_1)A$, wherein T equals the duty cycle of the series of pulses, A equals the preselected rate of air flow, S equals the motor speed, $S_{max}$ equals the maximum operating speed at maximum torque, $k_1$ and $k_2$ are constants representing the characteristics of the blower in the air handling system, $k_3$ and C are constants relating to the torque reduction rate above $S_{max}$ with $k_3=C/AS_{max}-k_1$, $S_{lim}$ is the speed limit, and $T_{min}$ is the minimum torque above the speed limit and is equal to $-k_3AS_{lim}+C$.

The proportionality constant $k_2$ at low speeds is again dependent on the characteristics of blower wheel and is generally proportional to the proportionality constant $k_1$. In particular, it has been found in many systems that the proportionality constant $k_2$ is half the value of the constant $k_1$ at operating speeds. Although microprocessor 24 has been described as operating in accordance with an algorithm, one skilled in the art will readily recognize that the microprocessor may also operate in accordance with a table defining the various speed torque characteristics of the system.

It is also readily apparent to one skilled in the art that the suggested algorithm, which is a multiple slope algorithm, is still an approximation of the ideal speed torque characteristics and that a more detailed or complex algorithm or table may be used to obtain a closer approximation. The table would be generated in the following manner. A value corresponding to each preselected air flow rate and for each increment of motor speed would be calculated and stored within memory for access by the microprocessor. Depending on the size of the table and the increments, such a table could provide a nonlinear or closer approximation of the ideal speed torque characteristics for each preselected air flow rate.

It has been found that the suggested algorithm is significantly more complete and accurate than the single slope approach suggested by Young in U.S. Pat. No. 4,806,833 and that such an algorithm operates over the entire range of operation of the air handling system and is not limited to a small range of air flow rates and static pressures as is the prior art. Furthermore, the algorithm is universal and with changes to the proportionality constant to account for different blower wheels and air handling systems, the apparatus according to the invention can be used in any type of blower system. For example, this system can be successfully implemented for blowers used in furnaces, in heat pumps, in central air conditioning systems and in other air handling systems with capacities of varying range and for different manufacturers.

The microprocessor may also provide protection against a locked rotatable assembly by functioning as means for disabling operation of the motor in the event that a speed signal is not provided to the microprocessor. In general, if an RPM signal is not provided to the microprocessor within a preset period of time, say 12 seconds, after a desired current (torque) signal is generated, the microprocessor can shut down to prevent motor damage. In one preferred embodiment wherein the microprocessor provides a soft start, i.e., a slowly increasing desired torque signal, the microprocessor resets if an RPM signal is not detected after 12 seconds. After 8 reset cycles, the microprocessor shuts down motor operation.

Considering now the graph of FIG. 2, there is shown a sequence of solid lines illustrated in a relationship between the speed and torque for a typical air conditioning system blower operated by motor 12 connected for driving squirrel cage blower 20 in system 22 built in accordance with the preferred embodiment of the invention. Each of the solid lines on the graph represents a constant CFM line. Each line illustrates the near linear relationship between speed and torque and the variation in speed and torque as static pressure increases for any given CFM. At low speeds, each solid line takes the form of a vertical line essentially defining a constant torque (current). For safety, the torque above the maximum operating speed ($S_{max}$) at the torque limit ($T_{max}$) is reduced to a minimum torque level ($T_{min}$) which maintains air flow. This defines the operating speed limit illustrated in FIG. 2. This reduction above the maximum operating speed is accomplished by the microprocessor and is defined by the algorithm. The setting of the torque limit depends on the system and safety factors and will be explained below in greater detail.

Figure 3:
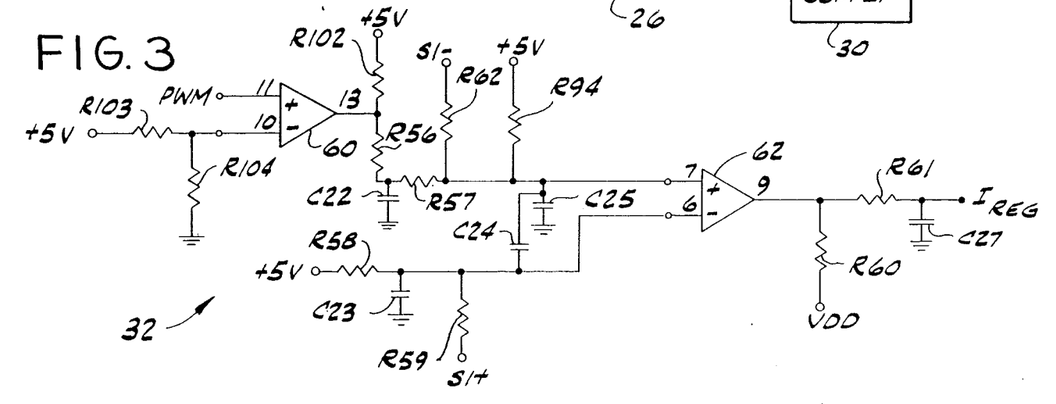
FIG. 3 is a schematic diagram of the comparison circuit of FIG. 1.

Referring to FIG. 3, one preferred embodiment of comparison circuit 32 according to the invention is illustrated. The preselected air flow signal, as a PWM signal, is provided to the noninverting input 11 of comparator 60 which functions as a buffer. Comparator 60 is an open collector comparator well known in the prior art providing a grounded output when the dc voltage applied to the noninverting input is greater than the dc voltage applied to the inverting input. A reference voltage is applied to the inverting input 10 of comparator 60 generated by the voltage divider formed by resistors R103 and R104. Output 13 of comparator 60 essentially follows input 11. A dc voltage is applied to capacitor C22 as divided by resistors R102 and R56. Output 13 essentially permits capacitor C22 to charge whenever the PWM signal applied to input 11 is high so that the charge on capacitor C22 represents the duty cycle of the PWM signal. In other words, capacitor C22 functions as an averager to produce a voltage representative of the duty cycle of the PWM signal applied to input 11. This is because the duty cycle of the PWM signal determines the amount of charging of capacitor C22. The maximum voltage level on capacitor C22 is adjusted by resistor R57. Terminal Sl- represents the negative side of the shunt resistor. The voltage of the Slterminal as adjusted by resistor R62 constitutes a bias point or reference for comparison of the motor current. This voltage is summed with the adjusted voltage provided after resistor R57 and applied to the noninverting input 7 of comparator 62. This voltage is further adjusted by applying a 5 volt bias signal through resistor R94.

The inverting input 6 of comparator 62 is then provided with a signal representing the motor current. In particular, terminal S1+ is connected to the positive side of the shunt resistor measuring the motor current and is applied to the inverting input 6 of comparator 62 as adjusted by the 5 volt bias signal applied through resistor R58. Capacitors C23, C24 and C25 provide noise filtering.

As a result, comparator 62 receives a reference adjusted signal at its noninverting input 7 which represents the duty cycle of the PWM signal, i.e., the desired current, and the inverting input 6 receives a signal representative of the motor current signal, i.e., the motor current. Comparator 62 compares these signals and provides a comparison signal at its output 9 representative of the difference. When the signal at input 7 is higher than the signal at input 6, indicating that the motor current is less than desired, output 9 goes high to apply voltage $V_{DD}$ through resistor R60 and resistor R61 to the $I_{reg}$ input of IC 26. This indicates to the IC 26 to apply motor voltage to the winding stages. In the event that signal applied to input 6 is greater than the signal applied to input 7, indicating that the motor current is greater than the desired current, output 9 goes low and is grounded to indicate to IC 26 that the voltage should not be applied to the motor windings. Capacitor C27 provides further noise filtering.

Resistors R56 and R57 determine the maximum voltage to which capacitor C22 can be charged. This maximum voltage essentially defines the torque limit of the system as illustrated in FIG. 2. In other words, selecting values of resistors R56 and R57 selects the dc voltage to which capacitor C22 gets charged at a 100% duty cycle. This maximum voltage corresponds to the maximum torque. To some extent, resistors R62 and R94 adjust this maximum torque limit.

Figure 4:
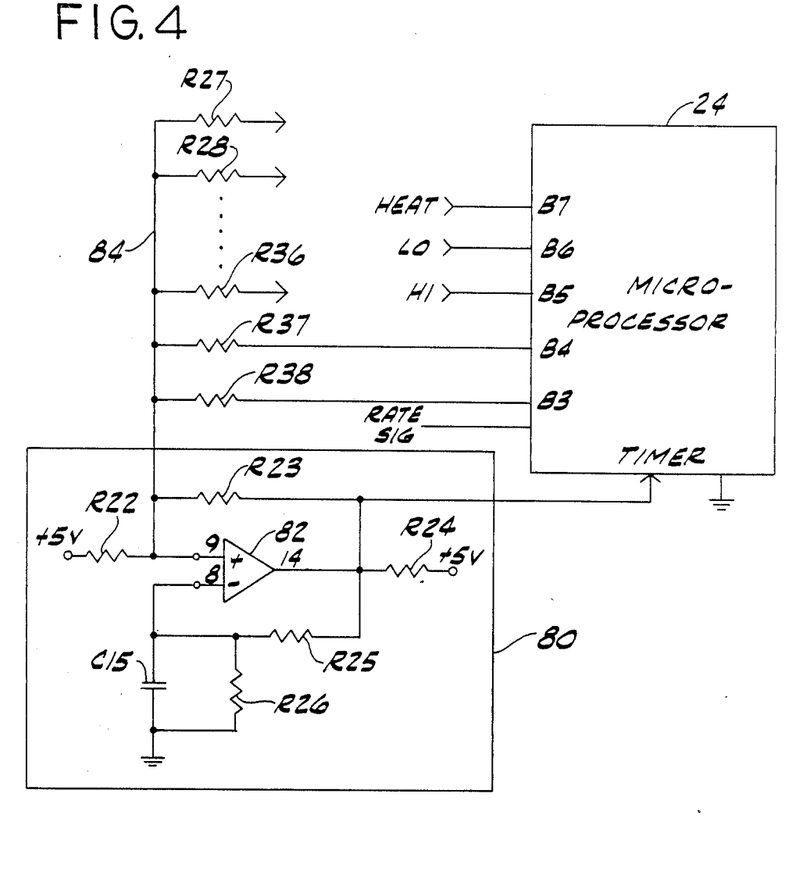
FIG. 4 diagram of the circuit indicating microprocessor the preset air flow rates and the value of constant $k_1$ indicating the characteristics of the air flow system.

Referring to FIG. 4, circuitry is illustrated for indicating to microprocessor 24 one or more preset values of the air flow rate and the value of the constant $k_1$. In the case of a continuously variable air flow control, microprocessor 24 is provided with the preselected air flow rate signal in the form of a pulse width modulated series of pulses having a duty cycle representative of the desired air flow rate. In the case of continuously variable air flow control, the presets define the minimum and maximum air flow rates. The duty of the air flow rate signals determines the desired air flow level between the minimum and maximum air flow rate. In the case of three speed control, the presets define the high (HI), low (LO) and heat (HEAT) air flow levels. Essentially, these presets are resistors R27-R36 which are connected to the HEAT, LO AND HI inPuts to microprocessor 24 by field selectable jumpers.

The microprocessor determines the value of the resistors connected to the HEAT, LO AND HI inputs in the following manner. Oscillator 80 generates an oscillating signal at pin 14. Oscillator 80 comprises comparator 82 biased by the +5 volts applied through resistor R22 to its noninverting input 9 and the +5 volts applied through resistor R24 to its output. Capacitor C15 in parallel with resistor R26 form an RC circuit between ground and the inventing input 8 and output 14 of comparator 82. Resistor R25 adjusts this feedback loop to provide an oscillating output. The noninverting input 9 oscillates due to feedback provided by resistor R23 as adjusted by resistor R22 and the resistance on line 84. Therefore, the frequency of the oscillating signal on pin 14 depends, in part, upon the resistance tied to input 9 via line 84. Microprocessor 24 selectively grounds outputs B7-B3 in order to measure at the timer input the oscillating frequency corresponding to the HEAT, LO, HI, $k_1$ and calibrating resistor. This frequency measurement is usually accomplished during periods that the fan is not operating.

The value of $k_1$ is assigned by the value of resistor R37. Resistor R38 provides a calibrating reference for comparison.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for controlling an air handling system including a motor having a stationary assembly with a plurality of winding stages for carrying motor current and further having a rotatable assembly in driving relation with a blower in the air handling system, the system further including means for generating a desired air flow rate signal which varies as a function of a desired rate of air flow, the apparatus providing control of the blower speed over a range of static pressure variations to maintain the rate of air flow in the system at substantially the desired air flow rate, the apparatus comprising:

means for providing a motor torque signal representative of the torque of the motor;

means for providing a speed signal representative of the speed of the motor;

a microprocessor, responsive to both the desired air flow rate signal and the speed signal, for generating a desired torque signal which is a function of both the desired air flow rate signal and the speed signal;

means for comparing the desired torque signal to the motor torque signal and for supplying a comparison signal in response to the comparison; and means for applying a motor voltage to one or more of the winding stages at a time in accordance with the comparison signal and for commutating the winding stages in a preselected sequence to rotate the rotatable assembly whereby the blower is driven by varying the motor torque according to motor speed to maintain air flow in the system at substantially the desired rate of air flow substantially independent of variations in the static pressure.

2. The apparatus of claim 1 wherein the desired torque signal generated by said microprocessor comprises a pulse width modulated (PWM) series of pulses having a duty cycle which is a function of both the desired air flow rate signal and the speed signal.

3. The apparatus of claim 2 wherein the duty cycle of the PWM series of pulses is defined by an algorithm in which the duty cycle is a linear function of the speed signal and the desired air flow rate signal, and wherein the linear function passes through the origin.

4. The apparatus of claim 3 wherein said microprocessor operates in accordance with the following algorithm;

$$T = k_1 AS,$$

wherein T equals the duty cycle of the series of pulses, A equals the desired rate of air flow, S equals the motor speed and $k_1$ equals a constant representing the characteristics of the blower in the air handling system.

5. The apparatus of claim 3 wherein said microprocessor operates in accordance with the following algorithm;

$$T = k_1 AS \text{ for } S \geq (k_2/k_1)A, \text{ and}$$

$$T = k_2 A^2 \text{ for } S \leq (k_2/k_1)A,$$

wherein T equals the duty cycle of the series of pulses, A equals the desired rate of air flow, S equals the motor speed and $k_1$ and $k_2$ are constants representing the characteristics of the blower in the air handling system.

6. The apparatus of claim 5 wherein $k_2$ is proportional to $k_1$.

7. The apparatus of claim 6 further comprising means for indicating the value of $k_1$ said microprocessor including an oscillator and means for varying the frequency of the oscillator as a function of the value of $k_1$.

8. The apparatus of claim 3 wherein said microprocessor operates in accordance with the following algorithm:

$$T = -k_3 AS + C \text{ for } S \geq S_{max}, \text{ and}$$

$$T = k_1 AS \text{ for } S_{max} \geq S \geq (k_2/k_1)A, \text{ and}$$

$$T = k_2 A^2 \text{ for } S \leq (k_2/k_1)A,$$

wherein T equals the duty cycle of the series and pulses, A equals the desired rate of air flow, S equals the motor speed, $S_{max}$ equals the maximum operating speed at maximum torque, $k_1$ and $k_2$ are constants representing the characteristics of the blower in the air handling system and $k_3$ and C are constants relating to the torque reduction rate above $S_{max}$ with $k_3 = C/AS_{max} - k_1$.

9. The apparatus of claim 3 wherein said microprocessor operates in accordance with the following algorithms:

$$T = T_{min} \text{ for } S \geq S_{lim},$$

$$T = -k_3 AS + C \text{ for } S_{lim} \geq S \geq S_{max},$$

$$T = k_1 AS \text{ for } S_{max} \geq S \geq (k_2/k_1)A, \text{ and}$$

$$T = k_2 A^2 \text{ for } S \leq (k_2/k_1)A,$$

wherein T equals the duty cycle of the series of pulses, A equals the desired rate of air flow, S equals the motor speed, $S_{max}$ equals the maximum operating speed at maximum torque, $k_1$ and $k_2$ are constants representing the characteristics of the blower in the air handling system, $k_3$ and C are constants relating to the torque reduction rate above $S_{max}$ with $k_3 = C/AS_{max} - k_1$, $S_{lim}$ is the speed limit, and $T_{min}$ is the minimum torque above the speed limit and is equal to $-k_3 AS_{lim} + C$.

10. The apparatus of claim 1 wherein the desired torque is defined by an algorithm which is a linear function of the speed and the desired rate of air flow, and wherein the linear function passes through the origin.

11. The apparatus of claim 10 wherein at least part of the algorithm defines the linear function as having a slope proportional to the desired air rate of air flow.

12. The apparatus of claim 1 wherein said microprocessor further comprises means for disabling operation of the motor in the event that the speed signal is not provided to the microprocessor.

13. The apparatus of claim 1 wherein said microprocessor comprises means for varying the torque of the motor in proportion to variations in motor speed, and in proportion to variations in the desired air flow rate signal.

14. The apparatus of claim 1 wherein said microprocessor operates in accordance with the following algorithm:

$$T = k_1 AS,$$

wherein T equals the desired torque of the motor. A equals the desired rate of air flow, S equals the motor speed and $k_1$ equals a constant representing the characteristics of the blower in the air handling system.

15. The apparatus of claim 1 wherein said microprocessor operates in accordance with the following algorithm:

$T = T_{min}$ for $S \geq S_{lim}$, $T = -k_3 AS + C$ for $S_{lim} \geq S \geq S_{max}$, $T = k_1 AS$ for $S_{max} \geq S \geq (k_2/k_1)A$, and $T = k_2 A^2$ for $S \geq (k_2/k_1)A$, wherein T equals the desired torque of the motor, A equals the desired rate of air flow, S equals the motor speed, $S_{max}$ equals the maximum operating speed at maximum torque, $k_1$ and $k_2$ are constants representing the characteristics of the blower in the air handling system, $k_3$ and C are constants relating to the torque reduction rate above $S_{max}$ with $k_3 = C/AS_{max} - k_1$, $S_{lim}$ is the speed limit, and $T_{min}$ is the minimum torque above the speed limit and is equals to $-k_3 AS_{lim} + C$.

16. The apparatus of claim 15 further comprising means for indicating the value of one or more of the constants to said microprocessor including an oscillator and means for varying the frequency of the oscillator as a function of the value of the constants.

17. The apparatus of claim 1 wherein the desired torque signal generated by said microprocessor is defined by a table specifying various values for the desired torque signal, each said value corresponding to a particular desired rate of air flow and a particular motor speed.

18. The apparatus of claim 1 further comprising means for indicating one or more preset desired rates of air flow to said microprocessor.

19. The apparatus of claim 18 wherein said means for indicating comprises an oscillator and means for varying the frequency of the oscillator as a function of the desired rate of air flow.

20. System for conditioning air and for maintaining a desired rate of air flow of the conditioned air through a contained space with respect to static pressure therein, the system comprising:
a motor having a stationary assembly with a plurality of winding stages for carrying motor current and further having a rotatable assembly in driving relation with a blower in the contained space;
means for generating a desired air flow rate signal which varies as a function of the desired rate of air flow;
means for providing a motor torque signal representative of the torque of the motor;
means for providing a speed signal representative of the speed of the motor;
a microprocessor, responsive to both the desired air flow rate signal and the speed signal, for generating a desired torque signal which is a function of both the desired air flow rate signal and the speed signal;
means for comparing the desired torque signal to the motor torque signal thereby to supply a comparison signal; and
means for applying a motor voltage to one or more of the winding stages at a time in accordance with the comparison signal and for commutating the winding stages in a preselected sequence to rotate the rotatable assembly whereby the blower is driven by varying the motor torque according to motor speed to maintain air flow in the contained space at substantially the desired rate of air flow substantially independent of variations in the static pressure.

21. Method for controlling an air handling system including a motor having a stationary assembly with a plurality of winding stages for carrying motor current and further having a rotatable assembly in driving relation with a blower in the air handling system, the system further including means for generating a desired air flow rate signal which varies as a function of a desired rate of air flow, the method providing control of the blower speed over a range of static pressure variations to maintain the rate of air flow in the system at substantially the desired air flow rate, the method comprising the steps of:
sensing the torque of the motor;
sensing the speed of the motor;
determining, by use of a microprocessor which is responsive to both the desired air flow rate signal and the sensed motor speed, a desired torque which is a function of both the desired air flow rate and the sensed motor speed;
comparing the desired torque to the sensed motor torque;
applying a motor voltage to one or more of the winding stages at a time in accordance with the comparison; and
commutating the winding stages in a preselected sequence to rotate the rotatable assembly whereby the blower is driven by varying the motor torque according to motor speed to maintain air flow in the system at substantially the desired rate of air flow substantially independent of variations in the static pressure.

22. The method of claim 21 wherein the torque of the motor is varied in proportion to variations in motor speed and in proportion to variations in the desired air flow rate signal.

23. The method of claim 22 wherein the torque of the motor is varied according to the following algorithm;

$T = k_1 AS$.

wherein T equals the desired torque of the motor, A equals the desired rate of air flow, S equals the motor speed and $k_1$ equals a constant representing the characteristics of the blower in the air handling system.

24. Apparatus for controlling a fluid handling system including a motor having a stationary assembly with a plurality of winding stages for carrying motor current and further having a rotatable assembly in driving relation with a fluid pump in the fluid handling system, the system further including means for generating a desired system parameter signal which varies as a function of a desired value for the parameter, the apparatus providing control of the fluid pump over various operating conditions of the fluid handling system to maintain the parameter at substantially the desired value, the apparatus comprising:
means for providing a motor torque signal representative of the torque of the motor;
means for providing a speed signal representative of the speed of the motor;

a microprocessor, responsive to both the desired parameter signal and the speed signal, for generating a desired torque signal which is a function of both the desired parameter signal and the speed signal;

means for comparing the desired torque signal to the motor torque signal and for supplying a comparison signal in response to the comparison; and means for applying a motor voltage to one or more of the winding stages at a time in accordance with the comparison signal and for commutating the winding stages in a preselected sequence to rotate the rotatable assembly whereby the fluid pump is driven by varying the motor torque according to motor speed to maintain the value of the parameter at substantially the desired value substantially independent of variations in the operating conditions of the fluid handling system.

25. Apparatus for controlling a fluid handling system including a motor having a stationary assembly with a plurality of winding stages for carrying motor current and further having a rotatable assembly in driving relation with a fluid pump in the fluid handling system, the system further including means for generating a desired system parameter signal which varies as a function of a desired value for the parameter, and means for generating a motor current signal representative of the motor current, the apparatus providing control of the fluid pump over a range of various operating conditions of the fluid handling system to maintain the parameter at substantially the desired value, the apparatus comprising:

means for providing a speed signal representative of the speed of the motor;

a microprocessor, responsive to both the desired parameter signal and the speed signal, for generating a desired current signal which is a function of both the desired parameter signal and the speed signal;

means for comparing the desired current signal to the motor current signal and for supplying a comparison signal in response to the comparison; and means for applying a motor voltage to one or more of the winding stages at a time in accordance with the comparison signal and for commutating the winding stages in a preselected sequence to rotate the rotatable assembly whereby the fluid pump is driven to maintain the value of the parameter at substantially the desired value substantially independent of variations in the operating conditions of the fluid handling system.

26. System for conditioning fluid and for maintaining as substantially constant a desired parameter of the conditioned fluid through a contained space with respect to variations in operating conditions of the contained space, the system comprising:

a motor having a stationary assembly with a plurality of winding stages for carrying motor current and further having a rotatable assembly in driving relation with a fluid pump in the contained space;

means for generating a desired system parameter signal which varies as a function of a desired value for the parameter;

means for providing a motor torque signal representative of the torque of the motor;

means for providing a speed signal representative of the speed of the motor;

a microprocessor, responsive to both a desired parameter signal and the speed signal, for generating a desired torque signal which is a function of both the desired parameter signal and the speed signal;

means for comparing the desired torque signal to the motor torque signal thereby to supply a comparison signal; and means for applying a motor voltage to one or more of the winding stages at a time in accordance with the comparison signal and for commutating the winding stages in a preselected sequence to rotate the rotatable assembly whereby the fluid pump is driven by varying the motor torque according to motor speed to maintain the value of the parameter at substantially the desired value substantially independent of variations in the operating conditions of the contained space.

27. Method for controlling an air handling system including a motor having a stationary assembly with a plurality of winding stages for carrying motor current and further having a rotatable assembly in driving relation with a fluid pump in a fluid handling system, the system further including means for generating a desired system parameter signal which varies as a function of a desired value for the parameter, the method providing control of the fluid pump over variations in the operating conditions of the fluid handling system to maintain the parameter at substantially the desired value, the method comprising the steps of:

sensing the torque of the motor;

sensing the speed of the motor;

determining, by use of a microprocessor which is responsive to both the desired system parameter signal and the sensed motor speed, a desired torque which is a function of both the desired system parameter signal and the sensed motor speed;

comparing the desired torque to the sensed motor torque;

applying a motor voltage to one or more of the winding stages at a time in accordance with the comparison; and commutating the winding stages in a preselected sequence to rotate the rotatable assembly whereby the fluid pump is driven by varying the motor torque according to the motor speed to maintain the value of the parameter at substantially the desired value substantially independent of variations in the operating conditions of the fluid handling system.

28. Apparatus for controlling an air handling system including a motor having a stationary assembly with a plurality of winding stages for carrying motor current and further having a rotatable assembly in driving relation with a blower in the air handling system, the system further including means for generating a desired air flow rate signal which varies as a function of a desired rate of air flow and means for generating a motor current signal representative of the motor current, the apparatus providing control of the blower speed over a range of static pressure variations to maintain the rate of air flow in the system at substantially the desired air flow rate, the apparatus comprising:

means for providing a speed signal representative of the speed of the motor;

a microprocessor, responsive to both the desired air flow rate signal and the speed signal, for generating a desired current signal which is a function of both the desired air flow rate signal and the speed signal;

means for comparing the desired current signal to the motor current signal and for supplying a comparison signal in response to the comparison; and means for applying a motor voltage to one or more of the winding stages at a time in accordance with the comparison signal and for commutating the winding stages in a preselected sequence to rotate the rotatable assembly whereby the blower is driven to maintain air flow in the system at substantially the desired rate of air flow substantially independent of variations in the static pressure.

* * * * *